(12) United States Patent
Brooks et al.

(10) Patent No.: US 11,338,933 B2
(45) Date of Patent: May 24, 2022

(54) ACOUSTIC HONEYCOMB PANEL WITH INTEGRATED ELECTRICAL HEATER

(71) Applicant: GKN Aerospace Services Limited, East Cowes (GB)

(72) Inventors: Ashley Brooks, East Cowes (GB); Ian Stott, East Cowes (GB)

(73) Assignee: GKN Aerospace Services Limited, East Cowes (GB)

( * ) Notice: Subject to any disclaimer, the term of this patent is extended or adjusted under 35 U.S.C. 154(b) by 849 days.

(21) Appl. No.: 16/074,442

(22) PCT Filed: Feb. 8, 2017

(86) PCT No.: PCT/GB2017/050312
§ 371 (c)(1),
(2) Date: Aug. 1, 2018

(87) PCT Pub. No.: WO2017/137740
PCT Pub. Date: Aug. 17, 2017

(65) Prior Publication Data
US 2019/0039746 A1   Feb. 7, 2019

(30) Foreign Application Priority Data

Feb. 8, 2016   (GB) ..................... 1602240

(51) Int. Cl.
*B64D 33/02* (2006.01)
*B64D 15/12* (2006.01)
(Continued)

(52) U.S. Cl.
CPC ............... *B64D 33/02* (2013.01); *B32B 3/12* (2013.01); *B32B 3/266* (2013.01); *B32B 7/12* (2013.01);
(Continued)

(58) Field of Classification Search
CPC .................. B64D 33/03; B64D 15/12; B64D 2033/0233; B32B 3/12; B32B 3/266;
(Continued)

(56) References Cited

U.S. PATENT DOCUMENTS 4,743,740 A * 5/1988 Adee ..................... B64D 15/00
156/273.9
5,841,079 A  11/1998 Parente
(Continued)

FOREIGN PATENT DOCUMENTS

EP  1826119 A2   8/2007
EP  1845018 A2  10/2007
(Continued)

OTHER PUBLICATIONS

China National Intellectual Property Administration Notification of First Office Action for Application No. CN 201780010410.6 dated Jun. 2, 2020 (12 pages; English translation).
(Continued)

*Primary Examiner* — Jeremy A Luks
(74) *Attorney, Agent, or Firm* — Bejin Bieneman PLC (57) ABSTRACT

A noise attenuation panel comprises a sound absorbing honeycomb layer disposed between a perforated surface layer on an airflow facing side of the panel and a composite support layer on a second opposing side of said panel. The composite material support layer comprises an electrical heat source.

19 Claims, 4 Drawing Sheets

(51) Int. Cl.
*F02C 7/045* (2006.01)
*F02C 7/047* (2006.01)
*B32B 3/12* (2006.01)
*B32B 3/26* (2006.01)
*B32B 7/12* (2006.01)
*B32B 15/04* (2006.01)
*H05B 3/48* (2006.01)
*F02K 1/82* (2006.01)

(52) U.S. Cl.
CPC .............. *B32B 15/04* (2013.01); *B64D 15/12* (2013.01); *F02C 7/045* (2013.01); *F02C 7/047* (2013.01); *F02K 1/827* (2013.01); *H05B 3/48* (2013.01); *B32B 2307/102* (2013.01); *B32B 2605/18* (2013.01); *B64D 2033/0206* (2013.01); *B64D 2033/0233* (2013.01); *F05D 2260/962* (2013.01); *F05D 2260/963* (2013.01); *Y02T 50/60* (2013.01)

(58) Field of Classification Search
CPC . B32B 7/12; B32B 15/04; F02C 7/045; F02C 7/047; H05B 3/48
See application file for complete search history.

(56) References Cited

U.S. PATENT DOCUMENTS

| | | | | |
|---|---|---|---|---|
| 7,291,815 | B2* | 11/2007 | Hubert | B64D 15/12 219/535 |
| 7,923,668 | B2* | 4/2011 | Layland | B64D 33/02 219/535 |
| 8,181,900 | B2* | 5/2012 | Chene | F02C 7/047 244/1 N |
| 9,469,408 | B1* | 10/2016 | Elangovan | B64D 15/12 |
| 10,159,114 | B2* | 12/2018 | Everly | F24D 13/02 |
| 2008/0166563 | A1* | 7/2008 | Brittingham | C08J 3/18 428/411.1 |
| 2011/0005188 | A1 | 1/2011 | Roger | |
| 2011/0126544 | A1 | 6/2011 | Foster | |
| 2015/0377128 | A1* | 12/2015 | Copiello | F01D 25/24 415/119 |
| 2017/0129616 | A1* | 5/2017 | Coat-Lenzotti | B05D 1/28 |

FOREIGN PATENT DOCUMENTS

| | | |
|---|---|---|
| EP | 1826119 A3 | 2/2010 |
| EP | 2292514 A2 | 3/2011 |
| EP | 2292514 A3 | 4/2013 |
| EP | 3135587 A1 | 3/2017 |
| GB | 2476855 A | 7/2011 |
| WO | 2014102682 A1 | 7/2014 |

OTHER PUBLICATIONS

International Search Report and Written Opinion for PCT/GB2017/050312 dated May 4, 2017 (10 pages).

Combined Search and Examination Report under Sections 17 and 18(3) for Application No. GB1602240.2 dated Mar. 15, 2016 (6 pages).

Xiegang Qui et al; "Ice Protection System for Aircraft"; National defense Industry Press, Jun. 30, 2004, pp. 73-74 (4 pages; English translation not available).

Chinese National Intellectual Property Administration Office Action for Application No. CN2021012602867210 dated Jan. 29, 2021 (27 pages; with English translation).

* cited by examiner

ACOUSTIC HONEYCOMB PANEL WITH INTEGRATED ELECTRICAL HEATER

CROSS-REFERENCE TO RELATED APPLICATIONS

This application is a national stage of, and claims priority to, Patent Cooperation Treaty Application No. PCT/GB2017/050312, filed on Feb. 8, 2017, which application claims priority to Great Britain Application No. GB 1602240.2, filed on Feb. 8, 2016, which applications are hereby incorporated herein by reference in their entireties.

BACKGROUND

Noise emission standards and regulations mean that the noise emitted from aircraft engines must be controlled within prescribed limits. In order to achieve this, noise attenuating or reducing panels are arranged on the air intakes of engines. They are commonly arranged in a cylindrical configuration. This is achieved using conventional noise attenuating panels which comprise a noise attenuating honeycomb layer with a perforated surface. Sound waves generated by the engine pass through the perforations and into the honeycomb chambers where the noise is attenuated.

This method successfully reduces the noise output of engines and is commonplace in the aero-industry.

A further requirement of aero-engine design is ice prevention systems which are located around the engine inlet. Conventional ice prevention systems use electrically heated panels or bleed air from the engines which heats the inlet surfaces and prevent ice building up. If ice builds-up it can break away from the surface and enter and damage the engine. Ice prevention systems can be operated in a de-ice mode where the preformed ice is melted or in a pre-emptive anti-ice mode where ice is prevented from forming.

In conventional aero-engines the ice-protection systems and noise attenuation systems are separately deployed at the inlet to the engine to separately prevent ice build-up and to control noise emissions.

The inventors have established a new arrangement which allows both of these requirements in aero-engine design to be achieved simultaneously and provides still further advantages.

SUMMARY

The present disclosure is concerned with heated panels for use in air intakes. An integrated heated and noise attenuating panel can be deployed on an air intake or nacelle of an aero engine, e.g., may be conveniently deployed on any aircraft intake such as engine nacelle, environmental control system, avionics cooling or the like.

Viewed from a first aspect there is provided a noise attenuation panel comprising a honeycomb layer disposed between a perforated surface layer on an airflow facing side of the panel and a composite support layer on a second opposing side of said panel, wherein the composite material support layer comprises an electrical heat source and wherein the honeycomb layer comprises heat conducting portions extending from the opposing layer to the perforated surface layer.

Conventional acoustic panels utilise an electrically insulating non-metallic honeycomb layer between a perforated layer that faces the airflow and through which sound waves can pass into the chambers forming the panel. These conventional panels are formed as cylinders at the intake of the aero engine thereby attenuating noise that would otherwise be emitted from the front of the engine.

Such conventional acoustic panels are formed using resins which bond the honeycomb to the perforated panel. The honeycomb itself is also formed using resin bonded materials. Thus, a conventional panel cannot be used to heat the perforated surface that faces the airflow entering the engine since they are poor heat conductors.

For most engines this is not a concern because there is sufficient space (area) to provide the necessary acoustic attenuation as well as the necessary heated surface. Conventionally the leading curved edge of the engine is heated (using engine bleed air as an example) and the trailing cylindrical surface inside the engine incorporates the acoustic panel. However, in applications where space is more limited, for example on smaller turbo-prop engines, meeting the acoustic and thermal needs for flight is increasingly difficult.

Composite materials are well known in the aerospace industry and are commonly referred to as glass or carbon fibre materials. For the avoidance of any doubt as to what is understood in the context of the present disclosure a composite material is a material consisting of fibres (either continuous or discontinuous, or a combination of both) incorporated into a polymer matrix. The engineering properties of a composite material are a combination of the properties of the constituents, and the way in which the fibres are orientated and laid-up affects the mechanical and physical properties of the composite. An effective composite material is one in which the engineering properties of the composite are more useful than the properties of the individual constituents.

Presently disclosed is replacing a conventional non-conducting honeycomb layer with a honeycomb layer that is all or part heat conducting. The acoustic panel comprises a perforated surface on an airflow facing side of the panel to allow sound waves to enter the chambers within the honeycomb layer. On an opposing side of the acoustic panel there is provided a composite support layer connected to the honeycomb layer which itself contains an electrical heat source. The heat source is configured such than heat is conducted to the conductive honeycomb and to the perforated surface.

Thus, a combined noise attenuation and ice preventing panel is advantageously provided. It will be recognised that replacing a non-metallic and lightweight honeycomb with a conducting honeycomb and additional heat source was counterintuitive at the time of the disclosure, not least because of the possible weight implications.

An acoustic panel according to the present disclosure provides a range of technical and performance advantages which are discussed further below.

A honeycomb layer is also a term well understood in the aerospace industry. Conventional noise attenuating systems commonly use a sound absorbing honeycomb layer such as that manufactured by the Hexcel Corporation under the trade name Acousti-Cap®.

Conventional sound absorbing layers are formed of paper walls bonded together with resin to form a plurality of hexagonal chambers or cells, the shape of which corresponds to the desired acoustic performance. Conventional acoustic layers are not electrically or thermally conductive.

According to the present disclosure the honeycomb layer is in the form of a plurality of sound attenuating chambers wherein the walls forming the chambers are metallic and heat conducting. The cross-sectional shape of each chamber is defined by the desired acoustic properties for the specific application. The walls forming each of the chambers are all (or alternatively some) heat conducting such that heat applied at one end of the wall can be conducted to the other end of the wall. In effect the walls define a heat path through the layer.

The walls may all advantageously be heat conducting such that a uniform transfer of heat can be achieved across the layer. Alternatively a predetermined heat distribution pattern or 'map' may be defined and heat conducting walls located accordingly.

Some walls may be optimised for structural strength and load bearing and others optimised for heat conductivity. It has been established that the wall thickness can be low whilst still achieving the desired thermal heat transfer. Depending on the desired thermal transfer, the wall thickness may be in the range of approximately 0.05-1 mm, where 0.1 represents the thickness of a standard aluminium honeycomb. The walls may be formed using additive manufacturing techniques.

The wall thickness may advantageously be varied in order to achieve local variations in properties (both thermal and structural).

Appropriate materials may be selected according to the desired distribution. Metallic materials for the layer may be selected from titanium or aluminium or alloys such as Titanium 64 (Ti64).

Advantageously the honeycomb layer is formed of a single metallic alloy such as, for example, a titanium alloy. Thus, the layer exhibits uniform thermal and mechanical properties.

Advantageously the composite support layer is bonded to the honeycomb layer by means of a resin adhesive such as FM300 manufactured by Cytec. Such a resin bond is sufficiently strong to accommodate the expected forces during use and is also able to maintain integrity when the layer is heated.

The amount of heat the honeycomb layer can conduct is principally limited by the maximum operating temperature of the surrounding resin material rather than the metal itself. Advantageously the resin is selected so that it can retain its integrity at up to 150° C.

The composite material support layer advantageously incorporates an electrically activated heater. Specifically, the heater may be embedded within the composite stack during manufacture and before the stack is cured. Embedding the heater within the support layer provides strength and support to the heater and also protects the heater element from damage or corrosion. The heater may for example form one or multiple layers within the stack of plies which are to be cured. Multiple heaters may provide redundancy in case of failure and/or additional heater output.

The electrical heater may be any suitable heater arrangement such as a thermally sprayed heater element. Here, the element contains tracks which increase in temperature when an electrical current is applied thereto. The conductive tracks may be made using any suitable technique such as wires, foils, meshes, sputtering, printed ink or thermally sprayed.

The electrical heater is provided with an electrical supply and control arrangement which will be understood by a person skilled in the art. The heater may be configured to dissipate up to 10 Watts/cm$^2$ of power to the support layer.

The heating tracks may advantageously align with the pattern of the honeycomb walls described above to optimise heat transfer from the support layer to the honeycomb layer.

In order to optimise heat dissipation to the honeycomb layer the heater embedded within the composite material support layer may be located proximate to the surface of the layer against which the honeycomb layer is bonded. The heat source may advantageously be located in the half of the composite material support layer closest to the honeycomb (when measured in depth away from the honeycomb layer). Thus, the heater can be sufficiently supported by the support layer and simultaneously the heat dissipated from the heater can be conducted to the honeycomb layer.

The heater is advantageously located as close to the metallic honeycomb as possible. Furthermore any thermal insulation between the heater and honeycomb is also minimised. This maximises heat transfer between the two. This must be done whilst maintaining electrical insulation between the two.

The panel may further comprise a metallic skin layer between the honeycomb layer and the composite material support layer. The term 'skin' is intended to mean that the layer is thinner with respect to the thickness of the honeycomb layer and support layer. Advantageously the skin may between 0.05 and 1 mm in thickness.

Advantageously a uniform metallic skin layer located between the heater containing composite support layer and the honeycomb layer uniformly spreads the heat generated within the support layer across the surface of the honeycomb. In effect a 'hot plate' is formed with the metallic skin layer allowing heat to spread laterally. This optimises heat transfer to all of the walls of the honeycomb layer.

The honeycomb and metallic skin may be bonded together with a suitable resin or glue which can maintain its integrity at the desired operating temperature of the panel.

The surface of the panel facing the airflow is provided with a perforated surface to allow sound waves to enter the noise attenuating chambers of the honeycomb panel.

The perforated surface thereby advantageously:
(i) acts as an anti-icing surface by dissipating heat;
(ii) allows sound to penetrate through the perforations and into the honeycomb chambers; and
(iii) caps and protects the metallic honeycomb (an erosion shield).

The perforated surface may be in the form of a composite material comprising the desired perforations. Such a perforated composite layer may advantageously provide the above benefits whilst being very light.

In an alternative arrangement the metallic skin layer may form the perforated layer itself, i.e., in the absence of a composite material layer on the air-facing side of the panel. Thus, the number of layers forming the panel can be reduced minimising thickness and optimising heat dissipation. Such an arrangement also removes the need for a further layer of resin.

The thickness of the perforated layer affects acoustic performance and is therefore defined by the noise attenuation requirements of the panel. For example the thickness may be 1 mm or less. In an alternative the thickness might exceed 1 mm.

In such an arrangement the metallic skin on the air-facing side of the panel may be thicker than the metallic skin between the composite support layer and the honeycomb.

Advantageously the metallic skin and the metallic honeycomb are the same material to avoid any thermal expansion issues. Suitable materials include Aluminium and Titanium or alloys thereof.

The honeycomb layer may advantageously be configured so that different regions exhibit different thermal conductivities. Thus, for a given panel a varying heat output can be achieved according to the given application. This could for example be achieved by selecting different materials for the walls of the chambers of the honeycomb. For example Titanium and Aluminium and alloys thereof could be used.

Alternatively the heater embedded within the composite material support layer may be adapted to achieve different heat outputs across its surface which in turn can be conducted through the metallic honeycomb to the opposing surface.

A panel according to the disclosure advantageously allows an acoustic panel to be provided with an anti-icing capability. Such an integrated acoustic panel and anti-ice system permits anti-icing to be achieved in locations of an engine where it was previously not possible to implement anti-icing.

Similarly the integration also allows noise attenuation to be realised at engine locations where noise attenuation was previously not possible. These two features are particularly advantageous for smaller engines or engines with inlets which are subject to stricter noise controls. One such example is low-level air inlets where noise levels must be reduced because of their proximity to airport staff.

The panel also allows complex geometries to be realised since each layer can be built up to correspond to the particular desired geometry. This also has significant advantages for minimising the size of engine inlets.

Viewed from another aspect there is provided an air inlet comprising a honeycomb layer disposed between a perforated surface layer on an airflow facing side of the panel and a composite support layer on a second opposing side of said panel, wherein the composite material support layer comprises an electrical heat source and wherein the honeycomb panel comprises heat conducting portions extending from the opposing layer to the perforated surface layer.

Thus, an air inlet may advantageously incorporate both noise attenuation properties in combination with ice-prevention in a single compact and integrated panel.

Viewed from another aspect there is provided an anti-ice accretion panel for an aircraft comprising a metallic honeycomb layer disposed between a perforated surface layer on an airflow facing side of the panel and a composite support layer on a second opposing side of said panel, wherein the composite material support layer comprises an embedded electrical heater configured to conduct heat to the perforated surface layer through the metallic honeycomb layer.

Viewed from yet another aspect there is provided a method of making an acoustic attenuation panel comprising the steps of:
A. embedding an electrical heating element within a composite material support layer,
B. bonding a metallic honeycomb layer to said composite material support layer,
C. bonding a perforated surface layer to an opposing side of the honeycomb layer to the composite material support layer, and
D. perforating the surface layer after bonding.

Such a method provides an integrated acoustic attenuation panel and anti-icing panel as described herein.

The method may advantageously include an additional step in which a stainless steel mesh is bonded to the perforated surface. The size and distribution of the mesh is defined by the acoustic requirements of the panel.

Advantageously the fine stainless steel mesh extends over the entire air-facing surface of the perforated skin. The mesh acts as the aerodynamic surface over which airflow occurs. In one arrangement the mesh may additionally be formed using additive manufacturing techniques.

As discussed above with reference to the apparatus aspects of the disclosure it will be recognised that the same features apply to the method aspect defined above.

For example, the method may further comprise the step of bonding a metallic skin layer between the composite material support layer and the metallic honeycomb layer.

Additionally the method may comprise the step of bonding a metallic skin layer between the metallic honeycomb layer and the perforated surface layer.

The independent layers forming the panel may each be manufactured using conventional techniques. One such example is the conventional way in which composite parts are laid-up and cured to consolidate the resin and form the part. The heater may be incorporated using existing flame spray techniques of the sort used in existing anti-icing systems. Forming of the metallic honeycomb can also be realised using method known in the art for honeycomb manufacture.

However, the panel may also be formed using additive manufacturing techniques such as powder additive manufacturing techniques. Electron Beam Melting (EBM) is one such example. Because of the multi-layer nature of the acoustic panel described herein these manufacturing techniques are particularly advantageous.

The additive manufactured component may also be manufactured separately as a metallic honeycomb and metallic perforate (with option additional metallic skin). The two may then be brought together to form the heater mat.

Thus, a three stage process is used to form the panel. The first stage is a conventional composite component manufacturing technique. The second stage is an additive manufacturing technique which allows the intricate geometry of the honeycomb layer to be formed on the support layer. Finally a perforated air-flow facing layer is applied to 'cap' the honeycomb and provide a protective and thermally conductive layer to the panel.

A stainless steel mesh may also additionally be bonded on top.

It will be recognised that the features of the aspects of the disclosure(s) described herein can conveniently and interchangeably be used in any suitable combination.

SUMMARY OF THE DRAWINGS

Aspects of the disclosure will now be described, by way of example only, with reference to the accompanying figures in which.

The disclosed embodiments are susceptible to various modifications and alternative forms; specific embodiments are shown by way of example in the drawings and are herein described in detail. It should be understood however that drawings and detailed description attached hereto are not intended to limit the disclosure to the particular form disclosed but rather the disclosure is to cover all modifications, equivalents and alternatives falling within the spirit and scope of the claimed invention.

DETAILED DESCRIPTION

Figure 1:
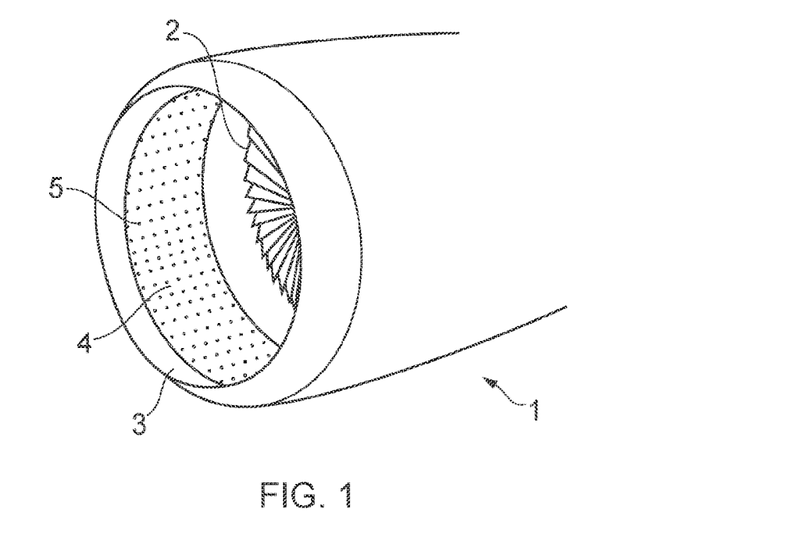
FIG. 1 shows an engine nacelle.

FIG. 1 illustrates a typical aero-engine nacelle 1.

The nacelle defines the inlet to the aero-engine which directs air to the compressor blades 2. In the context of the present disclosure the inlet can be divided into two regions.

The first region is the leading edge 3 of the nacelle which is a curved surface against which airflow collides and separates into an airflow passing into the engine and an airflow passing around the engine.

The second region is the inner wall of the inlet 4 which guides the air towards the compressor blades 2.

In a conventional aero engine an anti-ice system is deployed on the leading edge 3 to prevent any ice building up which might be ingested into the engine. In order to reduce the noise emitted from the engine the second region 4 is fitted with a noise attenuating surface in the form of a cylinder. The noise attenuating panel comprises a series of perforations 5 which allow sound waves to enter chambers beneath the surface which are designed to attenuate the noise. This is commonplace in the aerospace industry, that is the separate location of anti-icing and noise attenuation panels or surfaces.

According to the present disclosure there is provided an arrangement that permits anti-icing and noise attenuation to be combined. According to the present disclosure noise attenuation can be achieved all the way to the leading edge of the engine thereby optimising the noise attenuation effect.

Similarly, anti-icing can also be realised from the leading edge all the way along the inner surface of the inlet (or to the required length). This optimises the ice-prevention for the engine.

FIGS. 2, 3, 4 and 5 show different embodiments of a noise attenuation panel according to the present disclosure. Each figure shows a noise attenuation panel in cross-section.

In these figures the following reference numerals are used:

6 metallic mesh bonded onto layer 7 with thin layer of adhesive (not shown);
7 perforated composite layer 7;
8 metallic honeycomb;
9 adhesive perforated as per layer 7;
10 composite support layer;
11 adhesive;
12 heater;
13 perforated metallic skin; and
14 metallic skin.

The figures will now be described.

Figure 2:
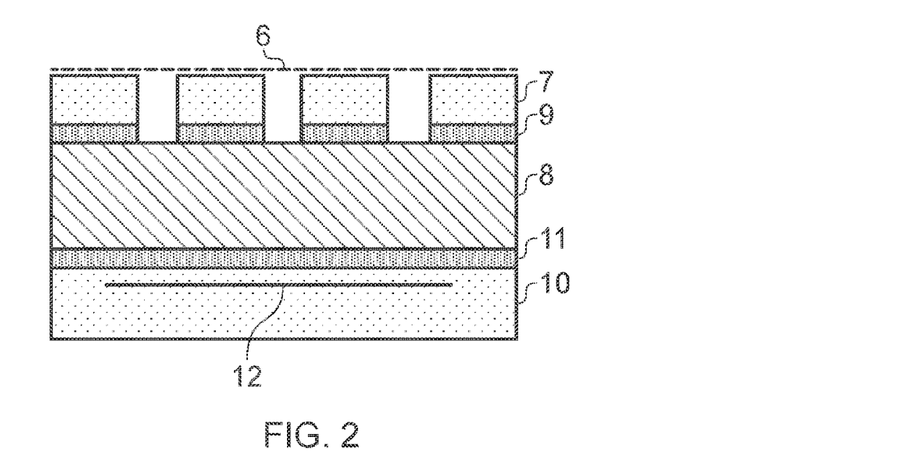
FIG. 2 shows a first arrangement of noise attenuating panel incorporating a perforated composite upper layer.

FIG. 2 shows a first arrangement comprising an airflow facing upper surface. This is also known as a breeze surface and corresponds to the second region 4 in FIG. 1.

The breeze surface 6 may be formed of any suitable material but advantageously may be a stainless steel mesh layer. The layer is manufactured using conventional manufacturing techniques and is provided with a plurality of perforations (not shown) which allow sound waves to pass through the layer into the honeycomb sound absorbing layer described below. A suitable mesh is, for example, a 30 RAYL mesh (RAYL being the unit for acoustic impedance). The specific value is application specific and depends on the noise source being attenuated. This particular type is manufactured by Gerrard Daniel Worldwide.

The layer 7 is bonded to the honeycomb layer 8 by means of an adhesive 9. The adhesive is selected so as to retain its bonding integrity at the operating temperature of the panel. One example of a suitable adhesive is FM300, manufactured by 3M. The adhesive layer 8 need not perforated per se, but may be designed so as not to block the holes when it is applied.

The honeycomb layer 8 is made up of a plurality of hexagonal chamber which are tessellated to cover the layer. The walls forming the hexagonal chambers are metallic and thermally conductive. In one arrangement the walls are formed from Titanium.

The wall length defines the depth of the layer 8 and is predetermined according to the desired sound absorbing properties/structural properties of the panel.

On the opposing side of the panel, that is the side distal from the air-flow facing side, the honeycomb layer 8 is bonded to a support or backing layer 10. The support layer is a composite material support layer formed of glass fibre. The honeycomb layer 8 and support layer 10 are bonded together with an adhesive resin 11 as described above.

The two adhesive layers 9, 11 hold the panel together.

The composite material support layer 10 is formed of a plurality of layers which are cured in a conventional manner to consolidate resin and form a rigid support layer for the panel. A rigid glass fibre support or backing layer is thereby formed. Importantly the composite material is a glass material so as to electrically insulate the heating elements contained within the layer.

The support layer 10 also comprises an embedded electrical heater. The embedded electrical heater is arranged such that a current passing through the tracks of the heater causes the tracks to become heated. Heat is transferred through the portion of the support layer between the heater and the honeycomb layer to the metallic walls of the honeycomb.

The heater may advantageously be embedded between two sub-layers of composite material which themselves may be bonded together. Alternatively the heater may be embedded as part of the process of laying-up the layers of composite material that make up the support layer. The entire support layer may then be cured together to create a rigid layer comprising the embedding heater.

The heater itself may be in the form of an elongate track or surface comprising suitable electrical connections for applying a potential difference. The track configuration will depend on the application but may, for example, be a winding or serpentine path so as to maximise the heat density for the panel.

The heater may advantageously be located very close to the upper surface of the support layer and close to the metallic walls of the honeycomb layer. Alternatively, so as to protect the heater, the heater may be located in the upper half of the support panel as illustrated in FIG. 2.

In operation an electrical current is applied to the heater 12 and heat is dissipated through the support layer 10, through the resin 11 and to the walls of the honeycomb layer 8. The walls act as heat conductors and heat is conducted towards the upper resin layer 9 and layer 7. This heat path causes the breeze surface 6 to be heated which prevents ice building up on the surface. Typically a power density of 5.5 Watts per $cm^2$ would be applied to the composite material support layer with a typical maximum operating temperature of 100 deg. C. This temperature is commonly limited by the adhesive properties.

Figure 3:
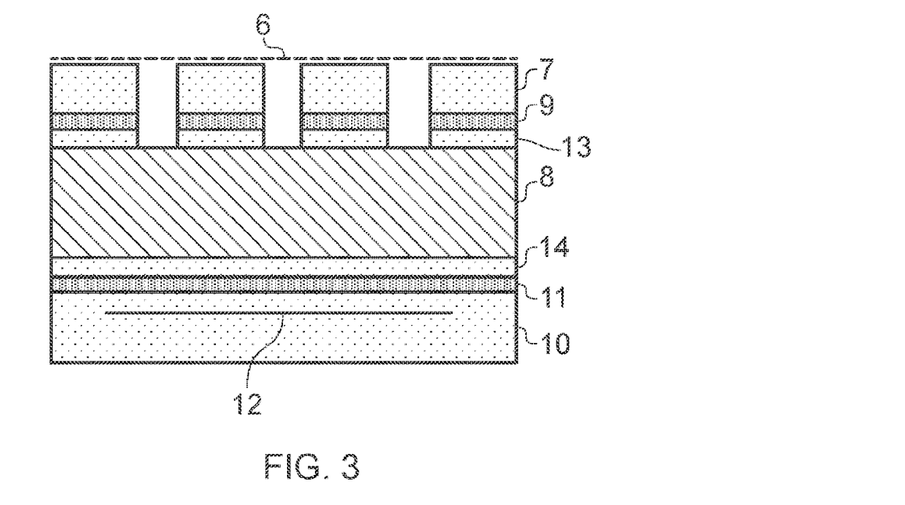
FIG. 3 shows a second arrangement of noise attenuating panel.

FIG. 3 shows a modified arrangement of the panel in FIG. 2 where like numerals represent the same layers as shown in FIG. 2. The arrangement in FIG. 3 additionally comprises a first metal skin 13 positioned between the adhesive resin 9 and the honeycomb layer. The metal skin 13 abuts with the upper surface of the honeycomb layer such that the metal skin 13 is in contact with the walls of the honeycomb layer. The metal skin acts as a heat collector conducting heat from the walls of the honeycomb layer. The metal skin allows heat to be conducted laterally (horizontally in FIG. 3) so as to uniformly dissipate heat to the breeze surface 6.

As with the composite layer 7 and adhesive 9 the metallic skin 13 is perforated in the same way so as to permit sound to pass through the layer and into the chambers of the honeycomb layer.

The panel in FIG. 3 also comprises a second metal skin 14 located between the honeycomb layer and the adhesive layer 11 of the composite material support layer 10. The metal skin 14 abuts with the lower surface of the honeycomb layer such that the metal skin 14 is in contact with the walls of the honeycomb layer. The metal skin 14 is not perforated but is continuous across the interface between the support layer and the honeycomb layer.

The metal skin 14 acts to transfer heat from the support layer 10 to the metal walls of the honeycomb.

Figure 4:
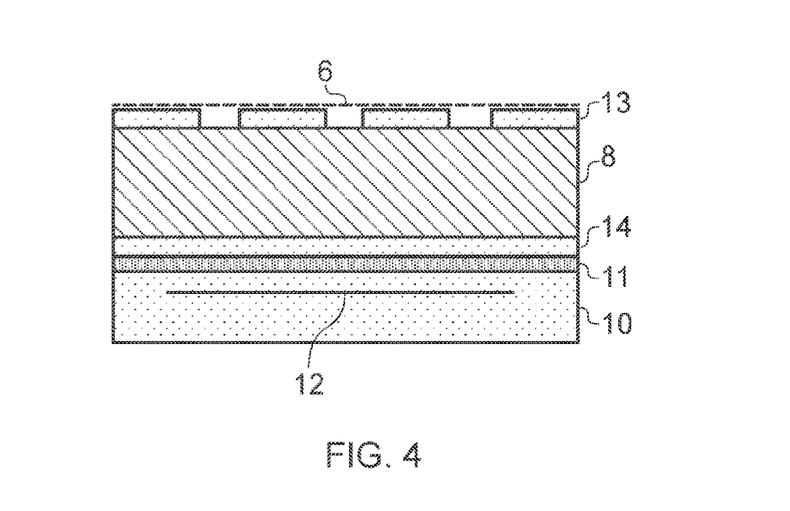
FIG. 4 shows a third arrangement of noise attenuating panel.

FIG. 4 is a still further adaptation of the panel and specifically a modification of the panel shown in FIG. 3.

As shown in FIG. 4 the panel comprises the same composite material support layer with embedded heater, adhesive 11 and metal skin 14 at the lower part of the panel (as viewed in FIG. 4). The panel additionally comprise the metallic honeycomb 8. The panel differs in that the upper perforated surface is itself metallic and in abutment with the honeycomb layer. In effect it combines the technical features of the upper composite layer and metal skin described above with reference to FIGS. 2 and 3. According to the arrangement in FIG. 4 the number of layers can be reduced and the panel simplified. This arrangement provides for a much thinner panel. The perforated layer itself dissipates the heat laterally to create a uniformly heated breeze surface.

A film adhesive may be used to bond the perforated metal skin to the metal honeycomb. Advantageously additive manufacturing may be used to manufacture the skin as part of the metallic honeycomb component.

Figure 5:
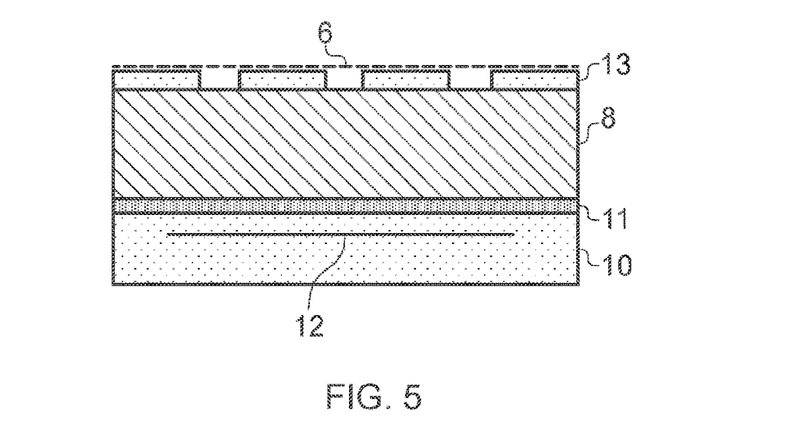
FIG. 5 shows a fourth arrangement of noise attenuating panel.

FIG. 5 shows a further arrangement of panel which corresponds to the panel show and described with reference to FIG. 4 but without the metal skin layer 14.

Figure 6:
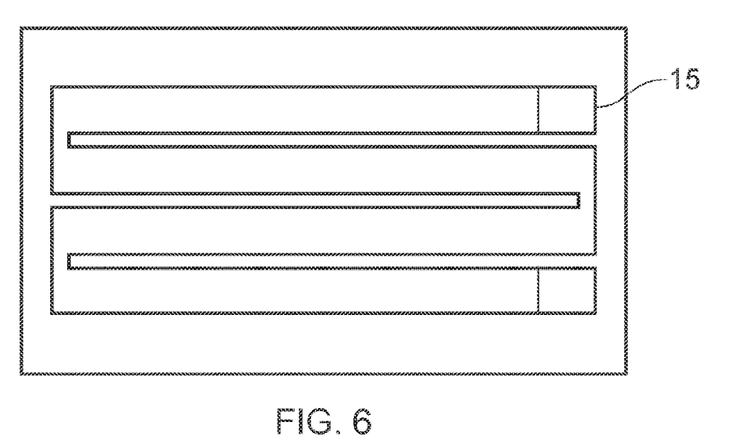
FIG. 6 shows an electrical track layout.

FIG. 6 illustrates a possible electrical track 15 layout for the embedded heater.

Each of the panels described in FIGS. 2 to 5 may be manufactured by forming the composite layers using conventional techniques and then bonding the honeycomb and options metallic skin layers thereto. Thus, an acoustic panel incorporating an anti-icing system can be realised. It will be recognised that the heater may be realised using conventional techniques and appropriate power supplies and controllers.

In an alternative method of manufacture the glass fibre (composite) layers may be made in using conventional techniques and the metallic honeycomb using an additive manufacturing technique.

For example, the composite material support layer with embedded heater may be manufactured using conventional composite component manufacturing technique and the metallic honeycomb layer may be created using an electron beam welding process. The upper perforated layer (as described with reference to FIG. 4 for example) may additionally be formed using the same or similar additive manufacture process. Thus, the honeycomb layer can be optimised for the specific application and printed or formed directly onto the composite material support layer (or metal skin).

Specifically the panel may be manufactured using an electron beam melting process using Ti64 powder.

The honeycomb and perforated metal skin may advantageously be formed as one component using the electron beam melting process. Thus the step of perforated skin does not need to be bonded as a separate manufacturing step. A stainless steel mesh may be bonded onto the component using a suitable spray adhesive.

The invention claimed is:

1. A noise attenuation panel, comprising:
a honeycomb layer disposed between a perforated surface layer on an airflow facing side of the panel and a composite support layer on a second opposing side of said panel,
wherein the composite material support layer comprises an electrical heat source, and
wherein the honeycomb layer comprises heat conducting portions extending from the opposing layer to the perforated surface layer;
wherein the honeycomb layer is provided with different thermal conductivities at predetermined positions across the honeycomb layer.

2. The panel of claim 1, wherein the honeycomb layer is a plurality of sound attenuating chambers and wherein walls forming the chambers are metallic and heat conducting.

3. The panel of claim 1, wherein the composite material support layer is bonded to the honeycomb layer by a resin adhesive.

4. The panel of claim 1, wherein the composite material support layer comprises an electrically activated heater.

5. The panel of claim 4, wherein the electrically activated heater is embedded within the composite material support layer.

6. The panel of claim 5 wherein the electrically activated heater is embedded within 1 millimeter of the bonded honeycomb layer.

7. The panel of claim 1, further comprising a metallic skin layer between the honeycomb layer and the composite material support layer.

8. The panel of claim 1, further comprising a metallic skin layer between the perforated surface layer and the honeycomb layer.

9. The panel of claim 8, wherein the metallic skin layer comprising perforations aligning with the perforations of the perforated surface layer.

10. The panel of claim 1, wherein the perforated surface layer is a metallic skin layer.

11. The panel of claim 7, wherein the metallic skin layer is between 0.05 and 1 millimeter in thickness and/or the wall thickness of the material forming the honeycomb layer is between 0.05 and 1 millimeter.

12. The panel of claim 7, wherein the metallic skin is a titanium alloy or a nickel alloy.

13. The panel of claim 1, wherein the honeycomb layer is formed of a titanium alloy.

14. The panel of claim 1, wherein the walls forming the chambers are metallic and the metal for each wall is selected according to a predetermined thermal conductivity at a respective predetermined position.

15. The panel of claim 14, wherein a plurality of walls are structural and made of a first metal, and the remaining walls are thermal conductors and made from a second metal.

16. The panel of claim 1, wherein the electrical heat source is an electrically conducting heating element extending across the area of the composite support layer aligning with the honeycomb layer.

17. The panel of claim 16, wherein the electrical heat source is a thermally sprayed element.

18. An air inlet, comprising:
- a honeycomb layer disposed between a perforated surface layer on an airflow facing side of a panel and a composite support layer on a second opposing side of said panel,
- wherein the composite material support layer comprises an electrical heat source, and
- wherein the honeycomb panel comprises heat conducting portions extending from the second opposing side to the perforated surface layer;
- wherein the honeycomb layer is provided with different thermal conductivities at predetermined positions across the honeycomb layer.

19. An anti-ice accretion panel for an aircraft, comprising:
- a metallic honeycomb layer disposed between a perforated surface layer on an airflow facing side of the panel and a composite support layer on a second opposing side of said panel,
- wherein the composite material support layer comprises an embedded electrical heater configured to conduct heat to the perforated surface layer through the metallic honeycomb layer;
- wherein the metallic honeycomb layer is provided with different thermal conductivities at predetermined positions across the metallic honeycomb layer.

* * * * *